UNITED STATES PATENT OFFICE.

THOMAS M. HART, OF NEW YORK, N. Y., ASSIGNOR TO PEREZ M. STEWART, TRUSTEE, OF NEW YORK, N. Y.

HYDROCARBONACEOUS OR BITUMINOUS PRODUCT AND PROCESS OF MAKING THE SAME.

1,252,433. Specification of Letters Patent. Patented Jan. 8, 1918.

No Drawing. Application filed September 30, 1915. Serial No. 53,455.

*To all whom it may concern:*

Be it known that I, THOMAS M. HART, a citizen of the United States, residing at 1133 Longfellow avenue, in the city of New York, county of Bronx, State of New York, have invented certain new and useful Improvements in Hydrocarbonaceous or Bituminous Products and Processes of Making the Same, of which the following is a specification.

This invention relates to a new hydrocarbonaceous or bituminous product and process of making the same, and has for some of its objects the production of homogeneous asphalt, and comprises the hardening or tempering of asphalt and rendering it substantially anhydrous and homogeneous in any character by associating therewith a chemical or substance capable of taking to itself water and fixing physically or chemically as water of crystallization, leaving a composition or compound of asphalt in which any free water which it may have contained has been converted into solid water of combination with the dehydrating agent with which it was associated.

As an example of one of the new compounds or compositions in accordance with the present invention and manner in which it may be produced or process whereby it may be made, the production of asphalt containing aluminium sulfate or alum will be taken.

In carrying out the process asphalt is taken and heated in a proper receptacle until it is melted, and to this is added gradually about five per cent. by weight of powdered burnt alum which is stirred in thoroughly until it has assimilated therewith and become a part thereof.

During the stirring in of the anhydrous alum into the asphalt its water of emulsification therein is seized by the burnt or anhydrous alum, combined therewith, and solidified thereby, forming more and more hydrous alum of solid nature which remains in solid form combined with the asphalt but which reduces the otherwise water containing asphalt or emulsified asphalt to a homogeneous consistency and nature, thus preventing blistering of the asphalt when applied to roads or otherwise employed and also yielding a product containing such lighter products as maintain a plastic resiliency of the finished product in contradistinction to and from the heat dried asphalt, which heating drives off all of the volatile products volatilizable below the points at which water is discharged by the action of heat as occurs when heat is employed for dehydration instead of chemicals as performed by the present process and thereby yields a product of superior character as to homogeneity and wearing quality.

The aluminium sulfate containing ingredient of the asphalt, such as alum, when present, has the tendency to cause or produce a thorough amalgamation of the asphalt by abstracting water of emulsification and fixing the same as aluminous water of crystallization, and at the same time producing a resistant finish to the surface of the asphalt when employed in road construction whereby friction is produced by the natural adherence to iron and steel, such as horse shoes, tires, etc., when brought in contact therewith, which is not attained in cases where asphalt contains sand, stone, or other crystallized silicious substance which has a natural attracting and retaining affinity for water on and to the surface and in contact with such mixture, and a corresponding anchorage for ice and frost when contacting with or resting upon its surface.

The substances capable of dehydrating, withdrawing, abstracting, or fixing the water of emulsion in or from the asphalt and converting it into an asphalt non-repellent, such as solid water of crystallization in case of alum and similarly acting sulfates or substances, provides a means for producing and produces a thorough amalgamation or union of the asphalt, resulting in a solid and substantially compact, voidless, and tenacious asphaltic material. The alum or similar chemical dehydrating substance removes the water of emulsion by combining or uniting with the same and converting it into solid water of crystallization, thereby chemically dehydrating the material by contact, thus avoiding the difficulty experienced in dehydrating asphalt by the action of heat, as employed hitherto, and producing a product of greater tenacity, resilience, and utility.

The term "alum" employed in the specification and claims is intended to imply and does imply alum as such of anhydrous character or of sub-hydrous or hydrous crystalline nature, such as would be formed by the dehydration of asphalt by hygroscopic alum when associated with hydrous asphalt.

Any hydrocarbonaceous substance, such as tar, pitch, heavy petroleum products, and bituminous products of natural or artificial production or vegetable or mineral origin, may be employed instead of asphalt *per se*, and heated with dehydrous alum or sulfate containing substance, such as aluminium sulfate, and the dehydrating substance may be anhydrous, dehydrous, or dehydrated, when employed to transform the hydrocarbonaceous substance, and produce the desired product.

It is obvious that many sulfates such as iron sulfate, or aluminium sulfate, *per se*, are decomposed by the action of heat into iron or aluminium oxid and sulfur dioxid, but it is found that if these sulfates are united or combined with other metal sulfates such as sulfates of other metals such as the alkali-metals potassium or sodium that the decomposition or dissociation of the heavier metal sulfate by the action of heat is largely prevented. It is therefore found advantageous in the treatment of asphalt with metal sulfates and heat to employ double sulfates such as aluminium and sodium sulfate such as alum in a de-hydrated or de-hydrous condition whereby water of emulsion may be seized and fixed as water of crystallization by the de-hydrous alum at the melting point of asphalt and below the point at which water is directly evolved by the action of heat therefrom in the presence of asphalt constituents more volatile than water.

It will be noted that one of the objects of the present invention is to de-hydrate asphalt at a temperature below that at which water is driven off or evolved by the direct action of heat so that the asphaltic product will retain to a large extent the constituents which are volatile or evolved by the action of heat below the boiling point of water.

And it will be noted that the present invention contemplates exposing melted asphalt to the action of anhydrous or dehydrous sulfate below the point at which water is evolved from the hydrous sulfate.

Having now described my invention what I claim as new and desire to secure by Letters Patent is:—

1. A new composition of matter comprising a hydrocarbonaceous material associated with a material containing aluminium sulfate combined with water.

2. A new composition of matter comprising a hydrocarbonaceous material associated with a material containing alum containing water of combination.

3. A new composition of matter comprising a bituminous material associated with a material containing aluminium sulfate combined with water.

4. A new composition of matter comprising asphalt associated with a material containing aluminium sulfate combined with water.

5. A new composition of matter comprising asphalt associated with a material containing alum containing water of combination.

6. A new composition of matter comprising a chemically dehydrated hydrocarbonaceous material containing the hydrated dehydrating ingredient.

7. A new composition of matter comprising a chemically dehydrated bituminous material containing the hydrated dehydrating ingredient.

8. A new composition of matter comprising a chemically dehydrated asphalt containing the hydrated dehydrating ingredient.

9. The process of dehydrating bituminous material which comprises associating said material with a substance capable of converting water of emulsification into solid water of crystallization below the point at which water is evolved from the de-hydrating material by the action of heat.

10. The process of dehydrating asphalt which comprises associating said asphalt with a substance capable of converting water of emulsification into solid water of crystallization below the point at which water is evolved from the de-hydrating material by the action of heat.

11. The process of dehydrating bituminous material which comprises associating said material with a metal sulfate capable of converting water of emulsification into solid water of crystallization and exposing the ingredients to the action of heat below the point at which water is evolved.

12. The process of dehydrating asphalt which comprises associating said asphalt with a metal sulfate capable of converting water of emulsification into solid water of crystallization and exposing the ingredients to the action of heat below the point at which water is evolved.

13. The process of dehydrating asphalt which comprises associating said asphalt with a material containing aluminium sulfate capable of converting water of emulsification into solid water of crystallization and exposing the ingredients to the action of heat below the point at which water is evolved.

14. The process of dehydrating bituminous material which comprises associating said material with a material containing aluminium sulfate capable of converting water of emulsification into solid water of crystallization and exposing the ingredients to the action of heat below the point at which water is evolved.

15. The process of dehydrating bituminous material which comprises associating said material with alum capable of converting water of emulsification into solid water of crystallization and exposing the ingredients to the action of heat below the point at which water is evolved.

16. The process of dehydrating asphalt which comprises associating said material with alum capable of converting water of emulsification into solid water of crystallization and exposing the ingredients to the action of heat below the point at which water is evolved.

In witness whereof I have hereunto set my hand and seal in the presence of two witnesses.

THOMAS M. HART. [L. S.]

Witnesses:
   F. L. WHITNER,
   ERNEST H. BALL.